United States Patent
Huynh et al.

(10) Patent No.: US 8,780,478 B1
(45) Date of Patent: Jul. 15, 2014

(54) GREASE WEAR LEVELING FOR A DISK DRIVE

(71) Applicant: Western Digital Technologies, Inc., Irvine, CA (US)

(72) Inventors: Sang Huynh, Yorba Linda, CA (US); Kenneth J. Smith, Corona, CA (US); Johnathan C. Lloyd, Seal Beach, CA (US); Chun Sei Tsai, Tustin, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 100 days.

(21) Appl. No.: 13/627,952

(22) Filed: Sep. 26, 2012

(51) Int. Cl.
*G11B 5/55* (2006.01)

(52) U.S. Cl.
USPC .............................. 360/55; 360/75; 360/78.04

(58) Field of Classification Search
None
See application file for complete search history.

(56) References Cited

U.S. PATENT DOCUMENTS

| | | | | |
|---|---|---|---|---|
| 5,307,489 A | * | 4/1994 | Yamazaki | 360/75 |
| 5,491,816 A | * | 2/1996 | Matoba et al. | 714/2 |
| 5,615,368 A | * | 3/1997 | Terashima et al. | 360/78.04 |
| 5,826,003 A | * | 10/1998 | Matoba et al. | 714/6.32 |
| 6,754,024 B2 | | 6/2004 | Suk et al. | |
| 7,271,976 B2 | | 9/2007 | Ishii et al. | |
| 7,817,370 B2 | | 10/2010 | Cromer et al. | |
| 2002/0196574 A1 | | 12/2002 | Suk et al. | |
| 2006/0092549 A1 | | 5/2006 | Ishii et al. | |
| 2008/0239545 A1 | | 10/2008 | Cromer et al. | |
| 2010/0134912 A1 | | 6/2010 | Koester | |

* cited by examiner

*Primary Examiner* — Wayne Young
*Assistant Examiner* — James L Habermehl

(57) ABSTRACT

Grease wear leveling in a disk drive including an actuator for moving a head over a disk as part of a seek operation. A count of seek operations is maintained and when the count of seek operations exceeds a first threshold number, one or more full stroke seek (FSS) operations are performed until a count of the FSS operations performed reaches a predetermined number. The FSS operation includes moving the head through a substantially wide range of motion. For each of the one or more FSS operations performed, the count of FSS operations performed is adjusted based on whether the most recent FSS operation was performed within a time window. The time window is based at least on a number of interval seek operations performed since a previously performed FSS operation.

20 Claims, 7 Drawing Sheets

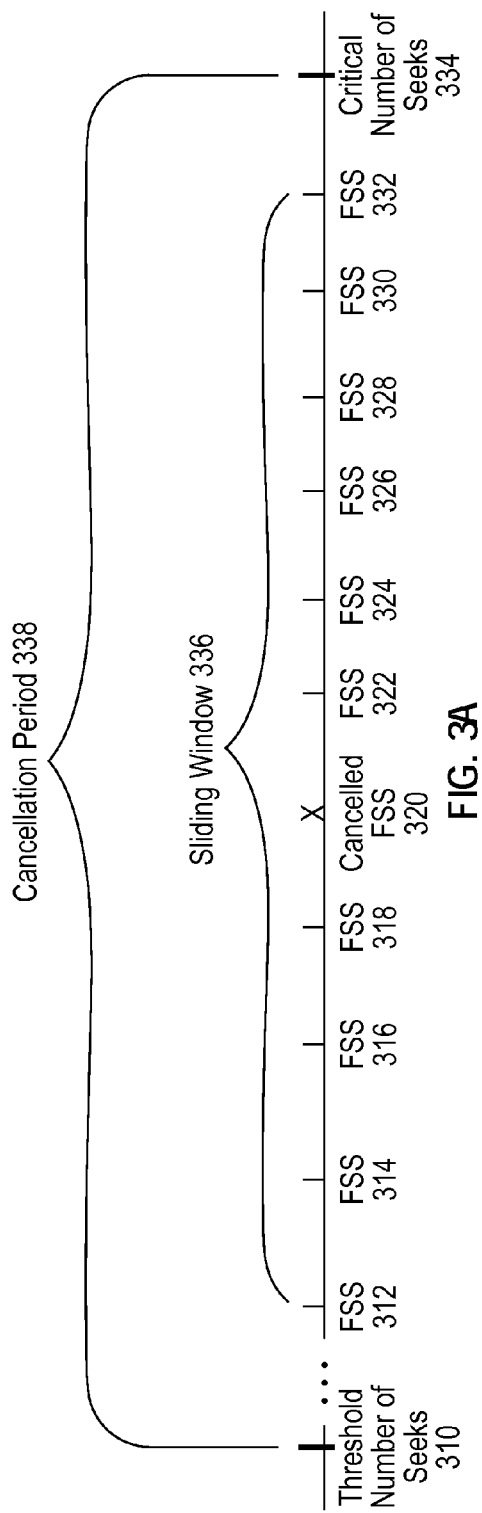

GREASE WEAR LEVELING FOR A DISK DRIVE

BACKGROUND

Disk drives are often used to record data onto or to reproduce data from a recording media. A disk drive can include a rotating magnetic disk and a head actuated over the disk. Such actuation of the head typically occurs as part of a seek operation to magnetically write data to and read data from the disk. During the seek operation, an actuator pivots about an actuator pivot to move the head over the disk. The actuator pivot includes pivot ball bearings lubricated with grease to facilitate a smooth actuator movement during seek operations.

A disk of a disk drive includes a plurality of radially spaced, concentric tracks for recording user data. The storage device industry is continually striving to increase the recording density of the disk, or in other words, the amount of data that can be stored in a given area on the disk. One way of increasing the recording density of the disk is to increase the number of tracks per inch (TPI) on the disk.

In contemporary disk drives with a high number of TPI and fast seek completion times, grease buildup in the actuator pivot can occur due to prolonged, limited motion of the actuator. This prolonged limited motion can result from repeated accessing of data confined within a small area of the disk. Over time, such prolonged limited motion can lead to a redistribution of grease around the perimeter of the limited range of motion of the actuator.

In a mild case, the grease buildup can manifest as increased settle times, or in other words, the time needed for the head to reach its desired location on the disk. In a worse case, the grease buildup may lead to failure of the disk drive as the actuator cannot overcome the "grease bump" when the actuator needs to seek across a larger area of the disk. Consequently, failure to move the head onto a ramp for resting the heads during a power-down of the disk drive can cause the head to touch the disk, thereby creating a "head on media" (HoM) situation which can ultimately destroy the disk drive.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed. Reference numbers are reused throughout the drawings to indicate correspondence between referenced elements.

FIG. 3A illustrates full stroke seek (FSS) operations performed within a sliding window in accordance with an embodiment.

FIG. 3B illustrates adjustment of a sliding window in accordance with an embodiment.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Figure 1:
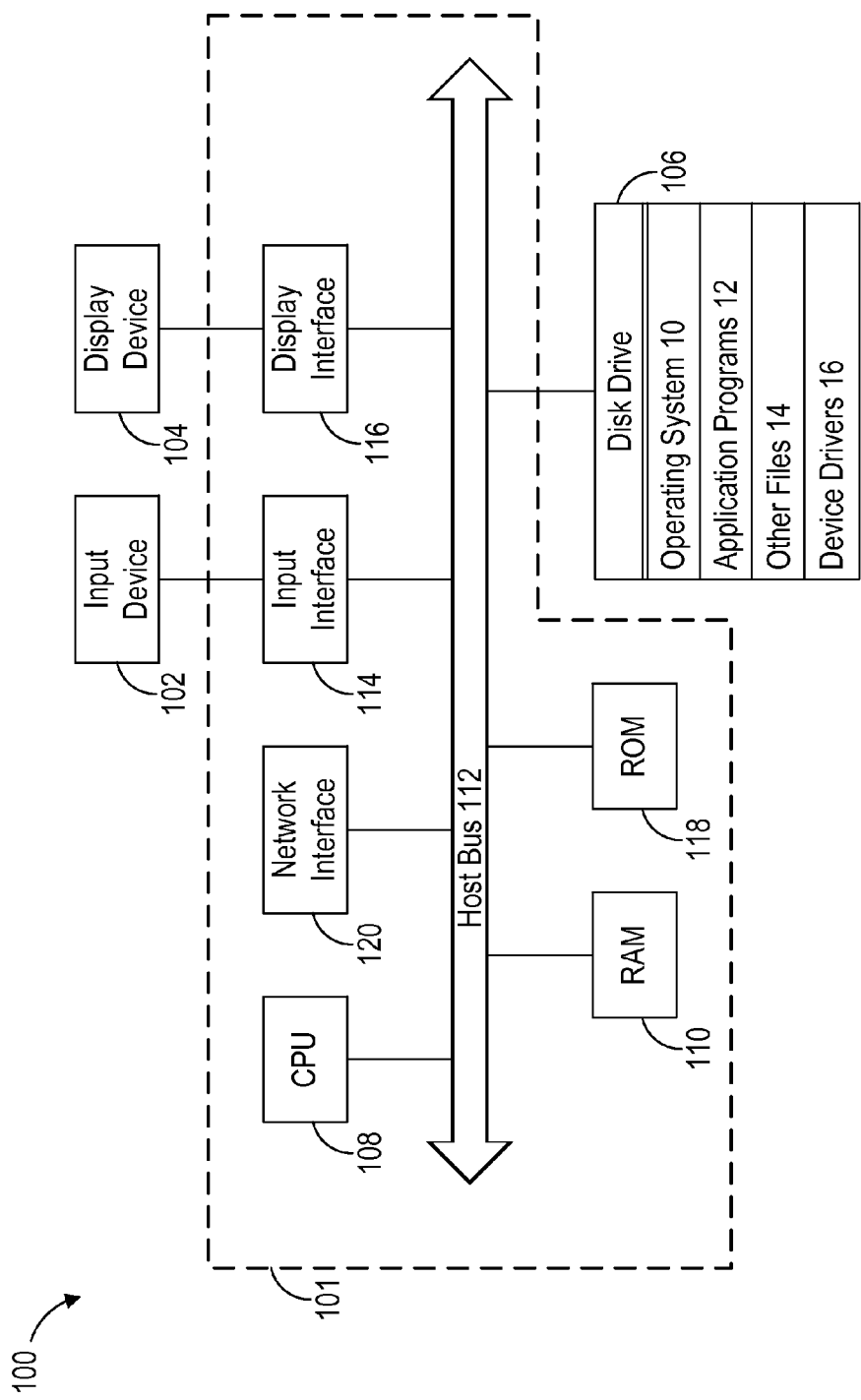
FIG. 1 is a block diagram depicting a computer system including a disk drive according to an embodiment.

FIG. 1 shows computer system 100 which includes host 101, input device 102, display device 104 and disk drive 106. Computer system 100 can be, for example, a cloud storage device, personal computer system, or other electronic device. In this regard, computer system 100 may be a stand-alone system or part of a network. Input device 102 can be a keyboard, scroll wheel, or pointing device allowing a user of computer system 100 to enter information and commands to computer system 100, or to allow a user to manipulate objects displayed on display device 104. In other embodiments, input device 102 and display device 104 can be combined into a single component, such as a touch-screen that displays objects and receives user input.

In the embodiment of FIG. 1, host 101 includes central processing unit (CPU) 108 which can be implemented using one or more processors for executing instructions including a microcontroller, a Digital Signal Processor (DSP), an Application Specific Integrated Circuit (ASIC), a Field Programmable Gate Array (FPGA), hard-wired logic, analog circuitry and/or a combination thereof. CPU 108 interfaces with host bus 112. Also interfacing with host bus 112 are random access memory (RAM) 110, input interface 114 for input device 102, display interface 116 for display device 104, read only memory (ROM) 118, network interface 120 and disk drive 106.

RAM 110 interfaces with host bus 112 so as to provide information stored in RAM 110 to CPU 108 during execution of instructions in software programs such as operating system 10, application programs 12, and device drivers 16. More specifically, CPU 108 first loads computer-executable instructions from disk drive 106 or another storage device into a region of RAM 110. CPU 108 can then execute the stored process instructions from RAM 110. Data such as data to be written to disk drive 106 or data read from disk drive 106 can be stored in RAM 110 so that the data can be accessed by CPU 108 during execution of software programs to the extent that such software programs have a need to access and/or modify the data.

As shown in FIG. 1, disk drive 106 includes application programs 12, which can include, for example, a word processing program or a multimedia program. In addition, disk drive 106 includes other files 14 and device drivers 16 for software interfaces to devices such as input device 102, display device 104 and/or disk drive 106.

Figure 2:
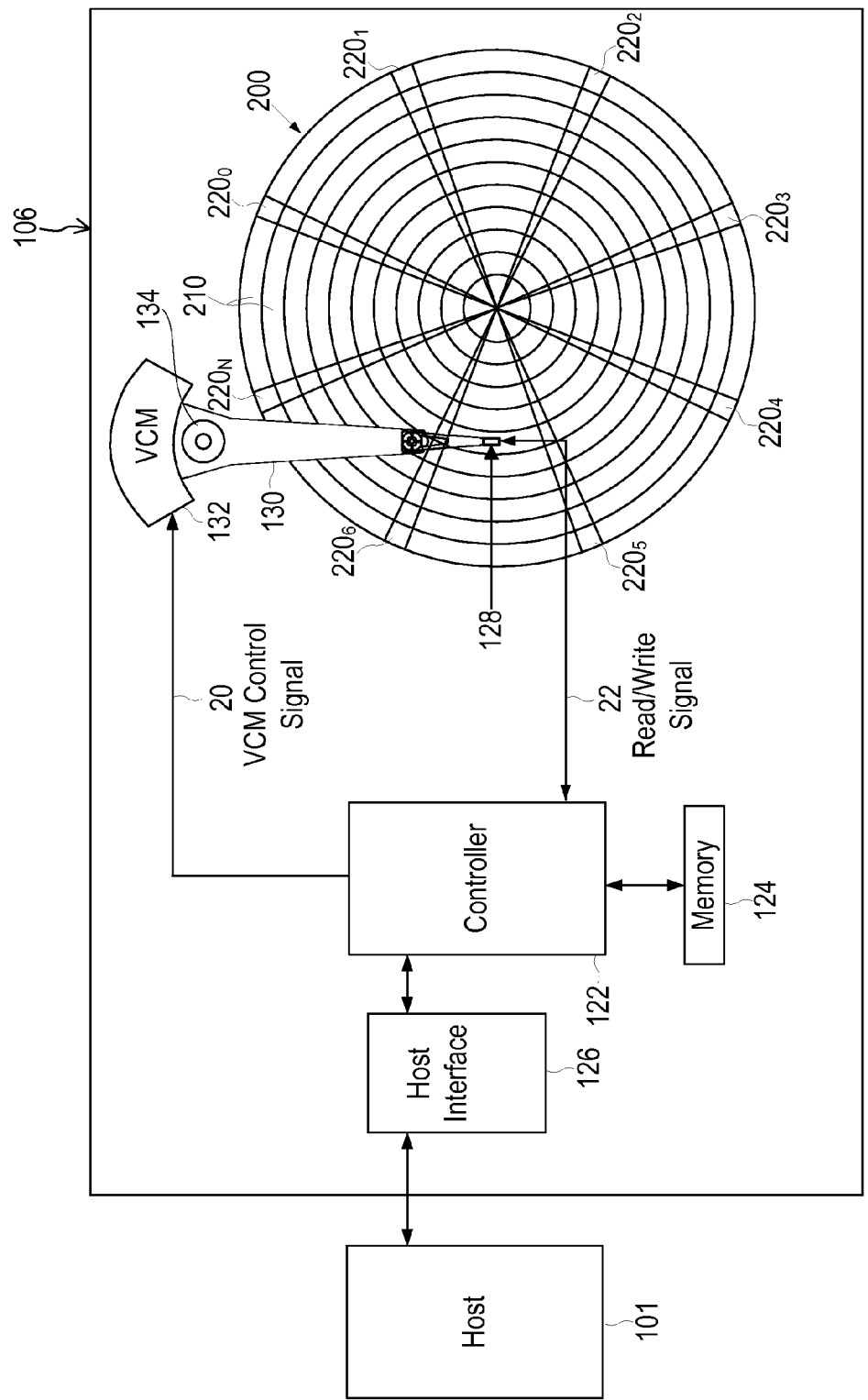
FIG. 2 is a block diagram depicting the disk drive of FIG. 1.

FIG. 2 illustrates a block diagram of disk drive 106 according to one example embodiment. As shown in FIG. 2, disk drive 106 includes rotating magnetic disk 200 and head 128 connected to the distal end of actuator 130. Disk drive 106 also includes a spindle motor (not shown) for rotating disk 200.

Actuator 130 is pivoted about actuator pivot 134 by voice coil motor (VCM) 132. During a seek operation, VCM 132 pivots actuator 130 about actuator pivot 134 to position head 128 over disk 200. Actuator pivot 134 includes a track of pivot ball bearings (not shown) that are lubricated with grease to provide smooth movement of actuator 130 about actuator pivot 134.

As shown in the example of FIG. 2, disk drive 106 includes controller 122 which can perform various operations of disk drive 106 described herein. Disk drive 106 also includes memory 124 and host interface 101. Memory 124 can include a volatile memory, such as DRAM, and/or a non-volatile memory for storing data. Data stored in memory 124 includes data read from disk 200, data to be written to disk 200, or instructions for controlling disk drive 106, such as instructions for performing processes such as the grease wear leveling processes described below. Controller 122 can be implemented using one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof.

Host interface 126 is configured to interface disk drive 106 with host 101 and may interface according to the serial advanced technology attachment (SATA) standard or other standards such as serial attached SCSI (SAS). As will be appreciated by those of ordinary skill in the art, host interface 126 can be included as part of controller 122.

Disk 200 comprises a number of radial spaced, concentric tracks 210, which may be grouped together into zones of tracks. Each track 210 is divided into a number of sectors that are spaced circumferentially along track 210. The sectors may be used to store user data and/or other information. Disk 200 also includes a plurality of angularly spaced servo wedges $220_0$-$220_N$, each of which may include embedded servo information that can be read from disk 200 by head 128 to determine the position of head 128 over disk 200. For example, each servo wedge $220_0$-$220_N$ may include a pattern of alternating magnetic transitions (servo burst), which may be read from disk 200 by head 128 and processed by controller 122 to estimate the position of head 128 relative to disk 200. The angular spacing between servo wedges $220_0$-$220_N$ may be uniform, as shown in the example of FIG. 2.

In operation, controller 122 writes data to and reads data from disk 200 as part of a seek operation in response to commands from host 101 received via host interface 126. When controller 122 receives a write command from host 101 with data to be written to disk 200, controller 122 temporarily holds the received data in memory 124. To write data to disk 200, controller 122 positions head 128 on disk 200 by sending VCM control signal 20 (e.g., control current) to VCM 132. Controller 122 positions head 128 based on position information read from one or more servo wedges $220_0$-$220_N$. Controller 122 processes data to be written to disk 200 into write signal 22, which is output to head 128. For its part, a write element (not shown) of head 128 converts write signal 22 into a magnetic field that magnetizes the surface of disk 200 based upon write signal 22, thereby magnetically writing data to disk 200. Controller 122 may notify host 101 via host interface 126 after data for the write command has been successfully written to disk 200.

When controller 122 receives a read command from host 101, requesting data written on disk 200, controller 122 positions head 128 on disk 200 by sending VCM control signal 20 to VCM 132. A read element (not shown) of head 128 generates read signal 22 based upon the magnetization of the disk surface under head 128, and controller 122 processes read signal 22 into data.

As noted above, to increase data storage capacity, disk 200 can include a relatively high number of tracks 210 on the surface of disk 200. As a result, grease buildup in actuator pivot 134 can occur due to prolonged limited motion of actuator 130 during seek operations. This prolonged limited motion can result from repeated accessing of data confined within a small area of disk 200.

In the present disclosure, disk drive 106 is capable of performing a grease wear leveling process to reduce the effects of grease build up. The grease wear leveling process can include performing a predetermined number of full stroke seek (FSS) operations after a certain number of seek operations has been performed. As used herein, a FSS operation includes moving head 128 through a substantially wide range of motion about actuator pivot 134. By performing the predetermined number of FSS operations, it is ordinarily possible to smooth out grease bumps to mitigate increased settle times and avoid HoM. However, since a FSS operation can take a relatively long time to complete, performing a FSS operation can have a negative impact on a command completion time for read and write commands if the disk drive is already performing a FSS operation.

One approach disclosed herein is to reduce delays in command completion time by spreading out a predetermined number of FSS operations across a limited number of seek operations when disk drive 106 is in an otherwise idle state. In this regard, it may be necessary to perform multiple FSS operations within a short period of time to effectively smooth out the grease bump. However, until the short amount of time expires, the partial number of completed FSS operations can be counted toward the predetermined number of FSS operations for smoothing out the grease bump.

In situations where actuator 130 has a high duty cycle, such as when actuator 130 is almost constantly pivoting about actuator pivot 134, the window of seek operations within which to perform the predetermined number of FSS operations can adjust or slide so that the predetermined number of FSS operations are performed within a certain number of interval seek operations.

Figure 3C:
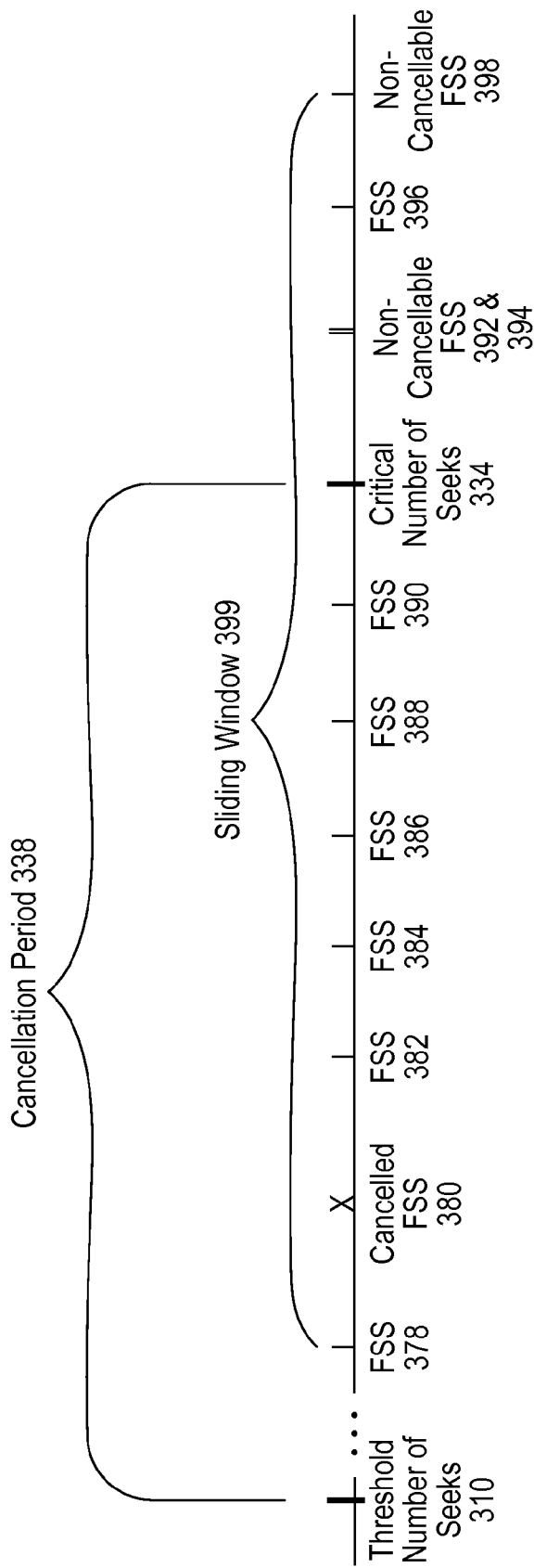
FIG. 3C depicts use of a sliding window outside of a cancellation period according to an embodiment.

FIGS. 3A to 3C illustrate examples of using a sliding window for performing a predetermined number of FSS operations in a grease wear leveling process. In FIG. 3A, the grease wear leveling process is initiated after a count of seek operations for disk drive 106 exceeds a threshold number of seek operations 310. The threshold number of seek operations 310 can vary depending upon design considerations of disk drive 106, such as the quality of grease used in actuator pivot 134 or an average seek range for actuator 130. For example, higher qualities of grease or a typically wider seek range may allow for a higher threshold number of seek operations. In one embodiment, the threshold number of seek operations 310 can be one million seek operations. In some embodiments, the threshold number of seek operations 310 may vary over the life of disk drive 106 depending upon a duty cycle of disk drive 106 or an age of disk drive 106. In one such example, the threshold number of seek operations may lower over time to compensate for degradation of grease in actuator pivot 134.

In other embodiments, the threshold for triggering the grease wear leveling process may not be a threshold number of seek operations, but rather, may include other threshold criteria, such as an elapsed time since a previous grease wear leveling process, a first powering-up of disk drive 106, or a specific command from host 101.

In the examples of FIGS. 3A to 3C, the threshold number of seek operations 310 also begins cancellation period 338, during which FSS operations can be cancelled or preempted by certain host commands, such as a read or write command. By giving host read and write commands priority over FSS operations during cancellation period 338, it is ordinarily possible to reduce the command completion time during the grease wear leveling process. In addition, the FSS operations initiated during cancellation period 338 are performed when disk drive 106 is in an otherwise idle state so as to reduce the effect of the grease wear leveling process on the command completion time.

Cancellation period 338 includes a range of interval seeks (not shown) between the threshold number of seek operations 310 and a critical number of seek operations 334. In the example provided above where the threshold number of seek operations 310 is one million seek operations, the critical number of seek operations 334 can be, for example, 1.1 million seek operations. The critical number of seek operations 334 may represent a point at which grease buildup can begin to hinder the performance of disk drive 106.

As shown in FIG. 3A, disk drive 106 completes cancellable FSS operations 312, 314, 316, 318, 322, 324, 326, 328, 330 and 332 within sliding window 336. Cancelled FSS operation 320 is a FSS operation that was begun, but was cancelled before completion due to a conflicting host command. In the examples of FIGS. 3A to 3C, a sliding window is based on a number of interval seek operations performed since a previously performed FSS operation. A goal of using the sliding window is to ensure that a predetermined number of FSS operations are completed within a certain time period, which in this case is measured by the number of interval seek operations performed since performance of a "first" FSS operation that triggered the start of the sliding window.

For example, sliding window 336 can be the time it takes for 2,000 interval seek operations to be performed or the time it takes for the predetermined number of FSS operations (e.g., 10) to be performed, whichever occurs first. In the embodiment of FIG. 3A, sliding window 336 begins with FSS operation 312 and does not reach the full number of interval seek operations (e.g., 2,000) since the predetermined number of FSS operations (10 FSS operations in this example) is performed within sliding window 336. After completion of FSS operation 332, the count of seek operations and the count of FSS operations are reset and the grease wear leveling process ends.

The predetermined number of FSS operations in the examples of FIGS. 3A to 3C are 10 FSS operations. However, as understood by those of ordinary skill in the art, the predetermined number of FSS operations can vary based on design considerations such as grease quality or an average seek range of motion for actuator 130.

As with the example of FIG. 3A, the example of FIG. 3B also includes threshold number of seek operations 310, critical number of seek operations 334, and cancellation period 338. However, unlike the example of FIG. 3A, the predetermined number of FSS operations (10) are not performed within a first sliding window (i.e., sliding window 372). More specifically, sliding window 372 begins with cancellable FSS operation 342. The next FSS operation, FSS operation 344, is then cancelled and FSS operations 346, 348, 350, 352, and 354 are then completed. FSS operation 356 is cancelled and the number of interval seek operations for sliding window 372 is reached before the predetermined number of 10 FSS operations. In this case, only six FSS operations are completed within sliding window 372.

Because the end of sliding window 372 is reached without the requisite number of FSS operations, a new sliding window 374 then begins at the next completed FSS operation following the first FSS operation 342 of first sliding window 372. As shown in FIG. 3B, sliding window 374 therefore begins at FSS 346 and the count of FSS operations is adjusted based on the most recently completed FSS operation within sliding window 372, which is FSS operation 354. At this point, the count of FSS operations for new sliding window 374 is five since the most recently completed FSS operation is the fifth completed FSS operation of sliding window 374. In some situations the new sliding window may start at a different FSS operation, such as FSS operation 348, if starting the new sliding window at FSS operation 346 would otherwise result in the limited number of interval seek operations having been already exceeded. In other situations, the new sliding window may not begin until a next FSS operation is completed if no previous FSS operations have been completed.

In other embodiments, the count of FSS operations can be adjusted such that the count of FSS operations equals the number of completed FSS operations performed within the limited number of interval number of seek operations before the most recently completed FSS operation. In such an embodiment, for example, the count of FSS operations can be determined based on the number of FSS operations completed within 2,000 interval seeks before FSS operation 354. In situations where there have not been any previously completed FSS operations within the limited number of interval seek operations, a new sliding window can begin with the next completed FSS operation.

In the example of FIG. 3B, eight FSS operations (FSS operations 346, 348, 350, 352, 354, 360, 362 and 364) are performed within second sliding window 374 before sliding window 374 ends due to reaching the predetermined number of interval seeks. Accordingly, new sliding window 376 begins at completed FSS operation 348 and ends at completed FSS operation 370 for a total of ten FSS operations completed (i.e., FSS operations 348, 350, 352, 354, 360, 362, 364, 366, 368, and 370) within sliding window 376, with FSS operations 356 and 358 having been cancelled. The grease wear leveling process ends after completion of FSS operation 370 since the predetermined number of FSS operations has been performed within sliding window 376. The count of seek operations and FSS operations are also reset. Although for illustration purposes there are multiple sliding windows depicted, in one embodiment the implementation may involve a single sliding window that is reset according to the guidelines discussed above and thus "slides" along the timeline to account for the number of interval seek and/or FSS operations.

FIG. 3C illustrates an example where not all of the predetermined number of FSS operations are completed within cancellation period 338. As shown in FIG. 3C, sliding window 399 begins with cancellable FSS operation 378 and ends with non-cancellable FSS operation 398. FSS operations 378, 380, 382, 384, 386, 388, and 390 are cancellable since they occur within cancellation period 338. Once the count of seek operations exceeds a second threshold number for the critical number of seeks 334, non-cancellable FSS operations 392 and 394 are performed in immediate succession. Unlike the FSS operations in cancellation period 338, FSS operations 392 and 394 cannot be preempted or cancelled by a host command.

In the example of FIG. 3C, two non-cancellable FSS operations are performed in succession and are followed by other non-cancellable FSS operations as required to reach the predetermined number of FSS operations within sliding window 399. Those of ordinary skill in the art will appreciate that other numbers of non-cancellable FSS operations can be performed in succession or that individual non-cancellable FSS operations can performed throughout a period following cancellation period 338. For example, other embodiments can have three non-cancellable FSS operations performed in succession.

After completion of a first set of non-cancellable FSS operations including FSS operations 392 and 394, FSS operation 396 is completed when disk drive 106 is in an idle state. In the example of FIG. 3C, FSS operation 396 is cancellable, however, FSS operation 396 can be non-cancellable in other embodiments. In addition, although FSS operation 396 occurs when disk drive 106 is in an idle state, FSS operation 396 in a different embodiment can occur after a set period of time or after a certain number of seek operations from non-cancellable FSS operation 394. After completion of cancellable FSS operation 396, disk drive 106 performs non-cancellable FSS operation 398, which can otherwise be a first non-cancellable FSS operation of a second set of two non-cancellable FSS operations. However, in the example of FIG. 3C, the predetermined number of FSS operations is reached within sliding window 399 after completion of non-cancellable FSS operation 398. The count of seek operations and the count of FSS operations is then reset, and the grease wear leveling process ends.

Figure 4:
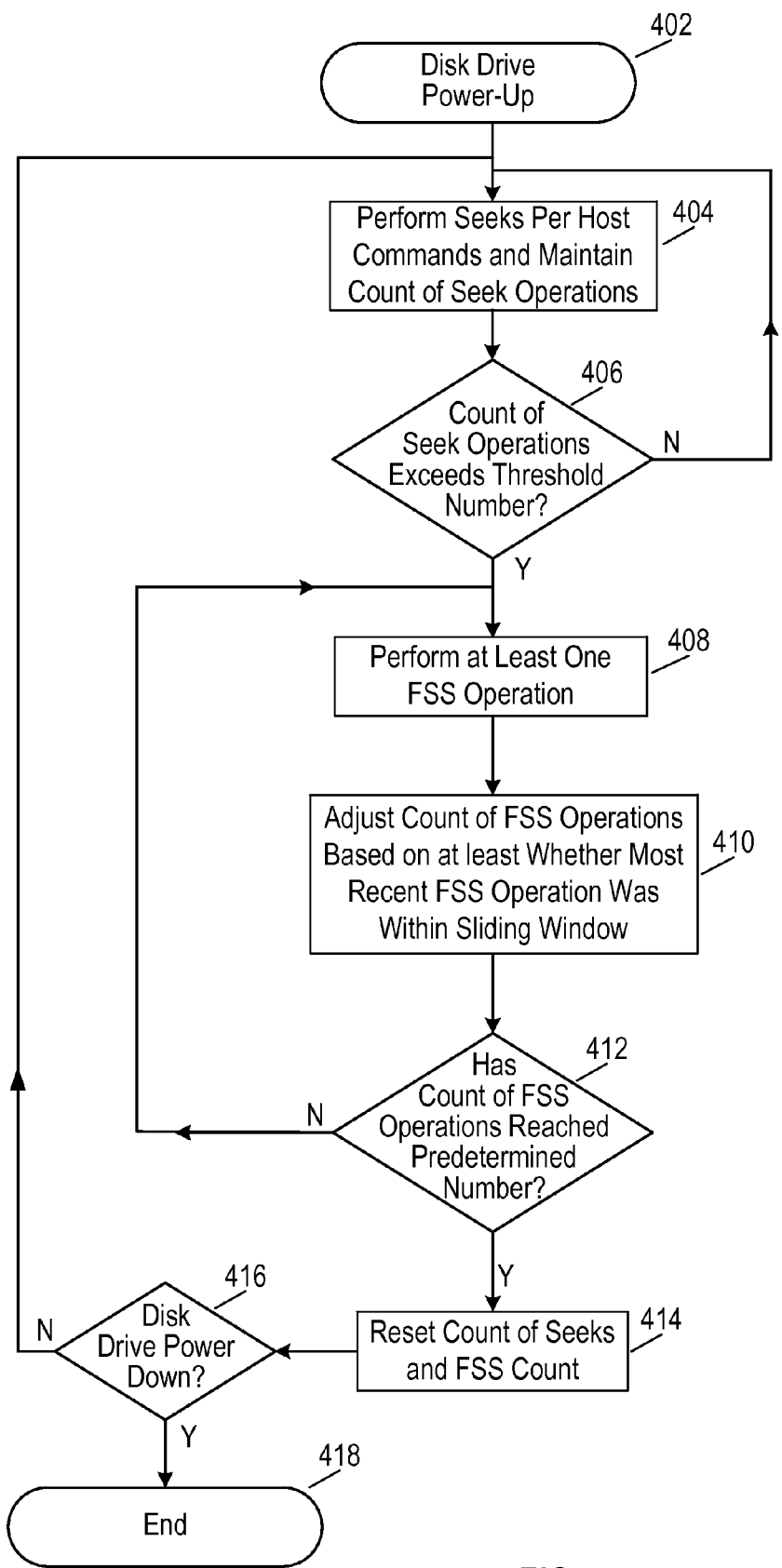
FIG. 4 is a flow chart for a grease wear leveling process according to an embodiment.

FIG. 4 is a flowchart including an example grease wear leveling process performed by disk drive 106. As shown in FIG. 4, the process starts upon power-up of disk drive 106 in block 402. In block 404, controller 122 controls actuator 130 via VCM 132 and actuator pivot 134 to perform seek operations based on commands received from host 101. In addition, controller 122 maintains a count of performed seek operations in memory 124.

In block 406, controller 122 determines whether the count of seek operations exceeds a threshold number of seek operations. If it is determined the count of seek operations does not exceed the threshold number of seek operations, disk drive 106 continues to perform seek operations and maintain the count of seek operations in block 404. If it is determined in block 406 that the count of seek operations exceeds the threshold number of seek operations, controller 122 controls actuator 130 to perform at least one FSS operation in block 408. The at least one FSS operation can be a cancellable FSS operation or a non-cancellable FSS operation. In addition, controller 122 may wait until disk drive 106 is in an idle state before performing the at least one FSS operation in block 408 to allow disk drive 106 to complete received host commands.

In block 410, controller 122 adjusts a count of completed FSS operations stored in memory 124 based on at least whether the FSS operation of block 408 was performed within a sliding time window of interval seek operations. As discussed above with reference to FIGS. 3A to 3C, whether the FSS operation of block 408 was performed within a current sliding window can be determined from the number of interval seek operations performed since a previous FSS operation. In some cases, the FSS operation performed in block 408 can be counted as the first FSS operation if there are no previously completed FSS operations within a limited number of interval seek operations.

As discussed above with reference to FIGS. 3A to 3C, the interval number of seek operations can be, for example, 2,000 seek operations. In such an example, the count of FSS operations can be adjusted to equal the number of completed FSS operations within 2,000 seek operations of the FSS operation performed in block 408.

In block 412, controller 122 determines whether the count of FSS operations has reached a predetermined number of completed FSS operations for the grease wear leveling process. If controller 122 determines that the count of FSS operations has not completed the predetermined number of FSS operations, the grease wear leveling process returns to block 408 to perform at least one FSS operation. If controller 122 determines in block 412 that the count of completed FSS operations has reached the predetermined number, controller 122 resets the count of seeks and the count of FSS operations in block 414.

In block 416, it is determined whether disk drive 106 has been powered-down. If so, the grease wear leveling process ends in block 418. If disk drive 106 has not been powered-down, the grease wear leveling process returns to block 404.

Figure 5A:
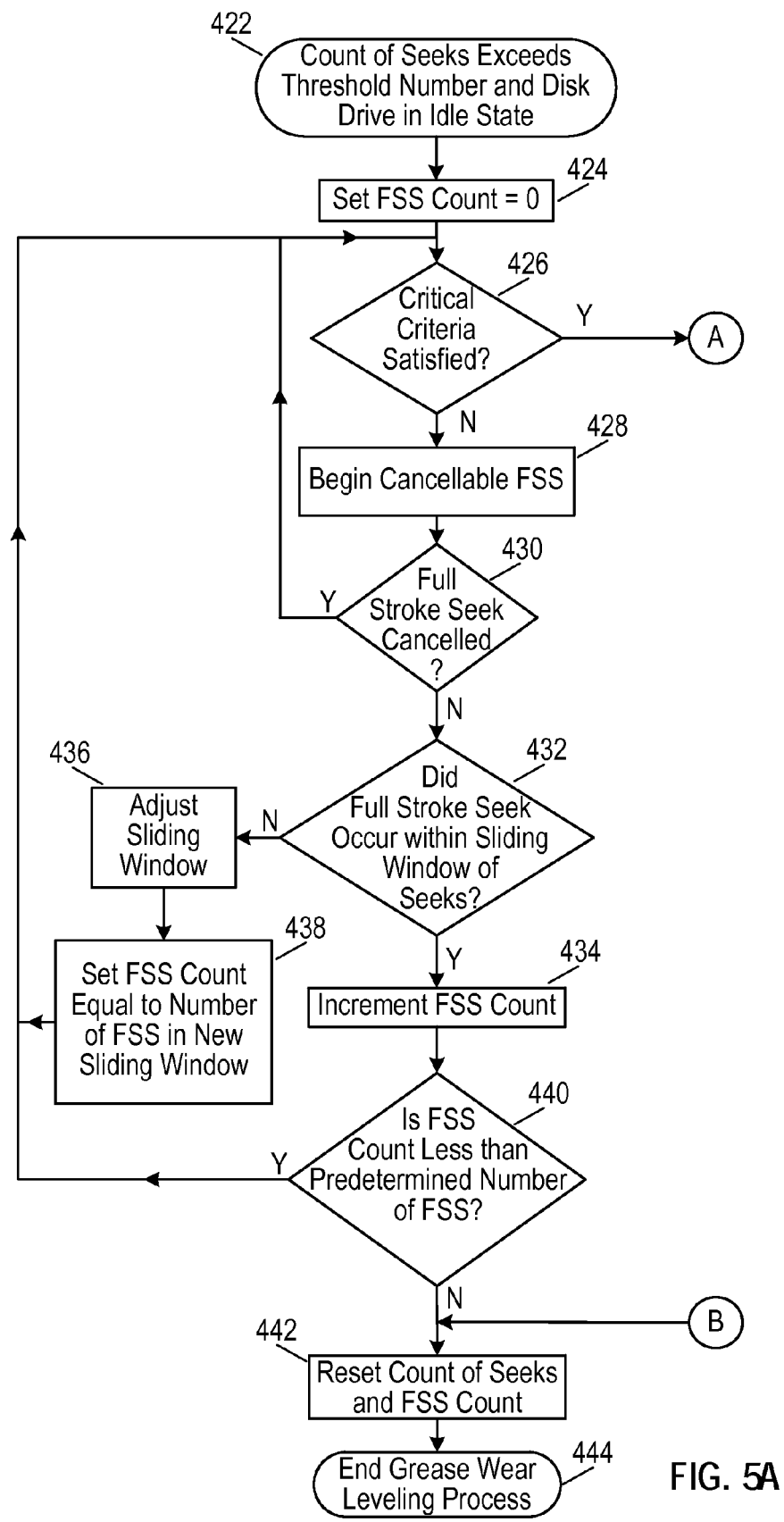
FIG. 5A is a flowchart for a grease wear leveling process according to an embodiment including cancellable FSS operations during a cancellation period and non-cancellable FSS operations following the cancellation period.

FIG. 5A is a flowchart of an example grease wear leveling process including a cancellable period and critical criteria for performing non-cancellable FSS operations. The process begins in block 422 when the count of seek operations exceeds the threshold number of seek operations and disk drive 106 is in an idle state, such as when disk drive 106 does not have any host commands to perform. In block 424, controller 122 sets the count of FSS operations to zero to initialize the count of FSS operations.

Figure 5B:
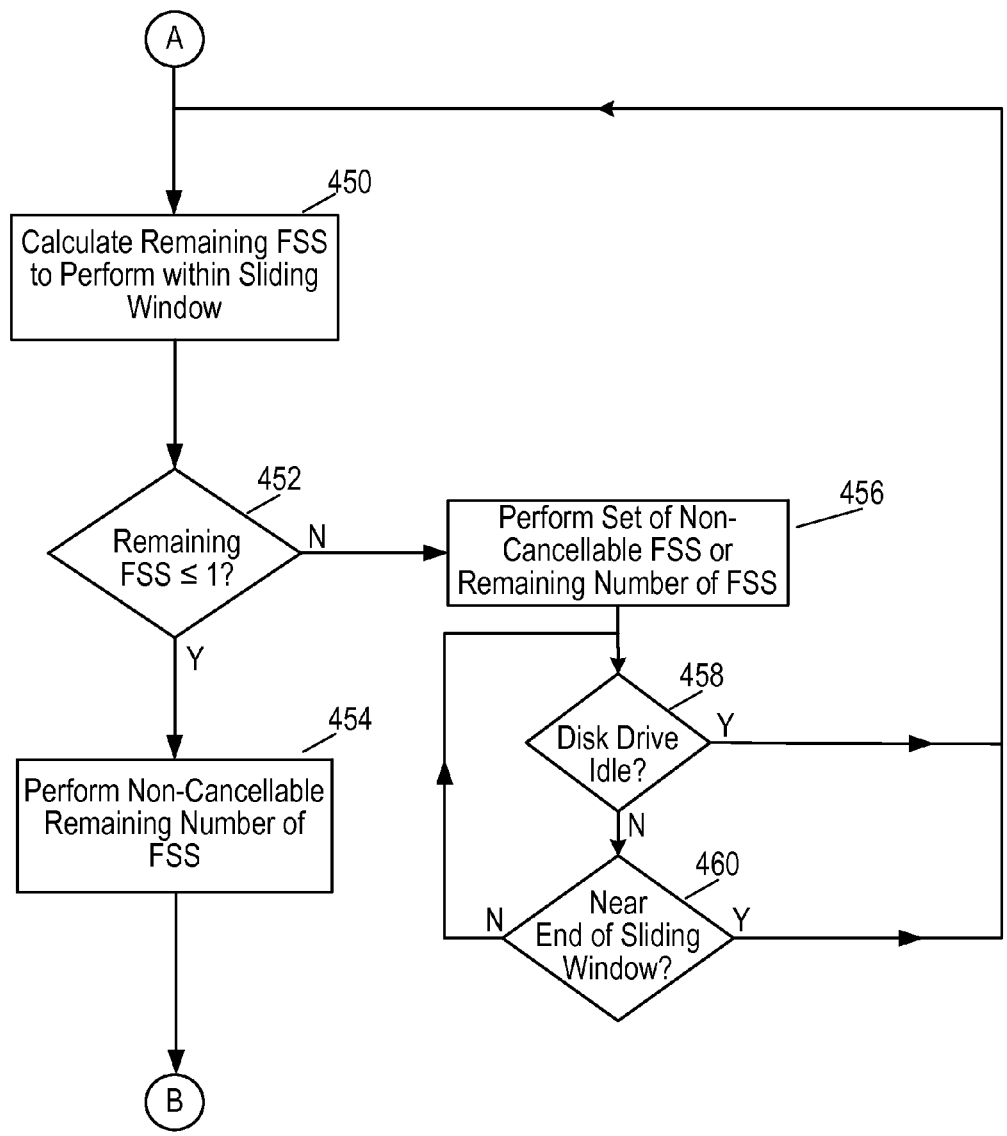
FIG. 5B is a flowchart depicting a sub-process of the grease wear leveling process of FIG. 5A.

In block 426, controller 122 determines whether a critical criteria has been satisfied. The critical criteria can be, for example, whether a second threshold number of seek operations has been exceeded or whether a certain amount of time has elapsed since the start of a grease wear leveling process. If controller 122 determines that the critical criteria has been satisfied in block 426, the process proceeds to the sub-process of FIG. 5B for performing non-cancellable FSS operations. The sub-process of FIG. 5B is described in more detail below.

In block 426 of FIG. 5A, if controller 122 determines that the critical criteria has not been satisfied, controller 122 controls actuator 130 to begin a cancellable FSS operation in block 428. If the FSS operation begun in block 428 is cancelled in block 430, the process returns to block 426 to determine whether the critical criteria has been satisfied. The FSS operation of block 428 can be cancelled, for example, if disk drive 106 receives a host read or write command while disk drive 106 is performing the FSS operation. After cancellation of the FSS operation in block 430, disk drive 106 can continue servicing successive host commands before returning to block 428 when disk drive 106 becomes idle.

If the FSS operation begun in block 428 is not cancelled, controller 122 determines in block 432 whether the completed FSS operation occurred within the sliding window of seeks, as described with reference to FIGS. 3A to 3C. If not, controller 122 adjusts the sliding window so that the completed FSS operation begun in block 428 is within the number of interval seeks for the sliding window. In one example, this may mean that a new sliding window begins with the completed FSS operation begun in block 428. In another example, a new sliding window can begin with a previously completed FSS operation that is within the number of interval seeks from the completed FSS operation begun in block 428. In block 438, controller 122 sets the count of FSS operations to the number of completed FSS operations in the new sliding window. The process then returns to block 426 to determine whether the critical criteria has been satisfied.

If controller 122 determines in block 432 that the FSS operation begun in block 428 completed within the sliding window, controller 122 increments the count of FSS operations in block 434. Controller 122 determines in block 440 whether the count of FSS operations is less than the predetermined number of FSS operations. If so, the process returns to block 426 to determine whether the critical criteria has been satisfied. On the other hand, if it is determined in block 440 that the count of FSS operations is not less than the predetermined number of FSS operations, the count of seeks and the count of FSS operations are reset in block 442. The grease wear leveling process then ends in block 444.

The flow chart of FIG. 5B depicts a sub-process of the grease wear leveling process of FIG. 5A. If controller 122 determines in block 426 of FIG. 5A that the critical criteria has been satisfied, the grease wear leveling process proceeds to block 450 of FIG. 5B where controller 122 calculates the remaining number of FSS operations to reach the predetermined number of FSS operations within the current sliding window. In block 452, controller 122 checks whether the remaining number of FSS operations calculated in block 450 is less than or equal to one. If so, controller 122 controls actuator 130 to perform the remaining number of non-cancellable FSS operations in block 454. The process then returns to block 442 in FIG. 5A to reset the count of seeks and the count of FSS operations.

Returning to FIG. 5B, if controller 122 determines in block 452 that the remaining number of FSS operations to reach the predetermined number of FSS operations is greater than one, controller 122 controls actuator 130 in block 456 to perform a set of non-cancellable FSS operations. For example, actuator 130 may perform a set of two non-cancellable FSS operations in succession. In the embodiment of FIG. 5B, if the number of non-cancellable FSS operations ordinarily performed is greater than the remaining number of FSS operations needed to reach the predetermined number of FSS operations, only the remaining number of FSS operations are performed in block 456.

In block 458, controller 122 determines whether disk drive 106 is in an idle state. If so, the sub-process returns to block 450 to calculate the remaining number of FSS operations to reach the predetermined number of FSS operations. On the other hand, if disk drive 106 is not in an idle state, controller 122 determines whether the end of the sliding window is near. For example, controller 122 may determine that the end of the sliding window is near if 10% or less of the number of interval seeks for the sliding window remain. Other embodiments may use a different number of remaining interval seeks to determine whether the end of the sliding window is approaching.

If it is determined in block 460 that the end of the sliding window is not near, the sub-process returns to block 458 to determine whether disk drive 106 is in an idle state. If it is determined in block 460 that the end of the sliding window is approaching, the sub-process returns to block 450 to calculate the remaining number of FSS operations to perform in the sliding window.

Those of ordinary skill in the art will appreciate that the various illustrative logical blocks, modules, and algorithm steps described in connection with the examples disclosed herein may be implemented as electronic hardware, computer software, or combinations of both. Furthermore, the foregoing algorithm steps can be embodied on a computer readable medium which causes a processor or computer to perform or execute certain functions.

To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A disk drive comprising:
   a disk for storing data;
   a head for reading data from the disk and for writing data to the disk;
   an actuator for moving the head over the disk as part of a seek operation; and
   a controller configured to:
   maintain a count of seek operations;
   when the count of seek operations exceeds a first threshold number, control the actuator to perform one or more full stroke seek (FSS) operations until a count of the FSS operations performed reaches a predetermined number, wherein a FSS operation comprises moving the head through a substantially wide range of motion; and
   for each of the one or more FSS operations performed, adjust the count of FSS operations performed based on whether the most recent FSS operation was performed within a time window,
   wherein the time window is based at least on a number of interval seek operations performed since a previously performed FSS operation.

2. The disk drive of claim 1, wherein the controller is further configured to adjust the count of FSS operations by excluding a previously performed FSS operation from the count of FSS operations when the interval seek operations exceed a threshold.

3. The disk drive of claim 1, wherein the controller is further configured to control the actuator to perform the one or more FSS operations when the disk drive is in an idle state.

4. The disk drive of claim 1, wherein the controller is further configured to control the actuator to perform a first of the one or more FSS operations when the disk drive is in an idle state and to perform a second one of the one or more FSS operations after the count of seek operations exceeds a second threshold number.

5. The disk drive of claim 4, wherein the controller is further configured to control the actuator to perform a third one of the one or more FSS operations immediately after performing the second FSS operation.

6. The disk drive of claim 4, wherein the controller is further configured to control the actuator to perform a third one of the one or more FSS operations when the disk drive is in an idle state.

7. The disk drive of claim 1, wherein the controller is further configured to reset the count of seek operations after the actuator has performed the predetermined number of FSS operations within the time window.

8. The disk drive of claim 1, wherein at least a portion of the predetermined number of FSS operations is performed after the count of seek operations exceeds a second threshold number.

9. A method for performing grease wear leveling in a disk drive, wherein the disk drive includes a disk for storing data, a head for reading data from the disk and for writing data to the disk, and an actuator for moving the head over the disk as part of a seek operation, the method comprising:
  maintaining a count of seek operations;
  when the count of seek operations exceeds a first threshold number, performing one or more full stroke seek (FSS) operations until a count of the FSS operations performed reaches a predetermined number, wherein a FSS operation comprises moving the head through a substantially wide range of motion; and
  for each of the one or more FSS operations performed, adjusting the count of FSS operations performed based on whether the most recent FSS operation was performed within a time window,
  wherein the time window is based at least on a number of interval seek operations performed since a previously performed FSS operation.

10. The method of claim 9, further comprising adjusting the count of FSS operations by excluding a previously performed FSS operation from the count of FSS operations when the interval seek operations exceed a threshold.

11. The method of claim 9, further comprising performing the one or more FSS operations when the disk drive is in an idle state.

12. The method of claim 9, further comprising performing a first of the one or more FSS operations when the disk drive is in an idle state and performing a second one of the one or more FSS operations after the count of seek operations exceeds a second threshold number.

13. The method of claim 12, further comprising performing a third one of the one or more FSS operations immediately after performing the second FSS operation.

14. The method of claim 12, further comprising performing a third one of the one or more FSS operations when the disk drive is in an idle state.

15. The method of claim 9, further comprising resetting the count of seek operations after performing the predetermined number of FSS operations within the time window.

16. The method of claim 9, wherein at least a portion of the predetermined number of FSS operations is performed after the count of seek operations exceeds a second threshold number.

17. A non-transitory computer-readable medium storing computer-executable instructions for performing grease wear leveling in a disk drive, wherein the disk drive includes a disk for storing data, a head for reading data from the disk and for writing data to the disk, and an actuator for moving the head over the disk as part of a seek operation, and wherein when the computer-executable instructions are executed by a processor, the processor:
  maintains a count of seek operations;
  when the count of seek operations exceeds a first threshold number, controls the actuator to perform one or more full stroke seek (FSS) operations until a count of the FSS operations performed reaches a predetermined number, wherein a FSS operation comprises moving the head through a substantially wide range of motion; and
  for each of the one or more FSS operations performed, adjusts the count of FSS operations performed based on whether the most recent FSS operation was performed within a time window,
  wherein the time window is based at least on a number of interval seek operations performed since a previously performed FSS operation.

18. The computer-readable medium of claim 17, wherein the computer-executable instructions further cause the processor to adjust the count of FSS operations by excluding a previously performed FSS operation from the count of FSS operations when the interval seek operations exceed a threshold.

19. The computer-readable medium of claim 17, wherein the computer-executable instructions further cause the processor to control the actuator to perform the one or more FSS operations when the disk drive is in an idle state.

20. The computer-readable medium of claim 17, wherein the computer-executable instructions further cause the processor to control the actuator to perform a first of the one or more FSS operations when the disk drive is in an idle state and to perform a second one of the one or more FSS operations after the count of seek operations exceeds a second threshold number.

* * * * *

UNITED STATES PATENT AND TRADEMARK OFFICE
CERTIFICATE OF CORRECTION

PATENT NO. : 8,780,478 B1
APPLICATION NO. : 13/627952
DATED : July 15, 2014
INVENTOR(S) : Sang Huynh et al.

Page 1 of 1

It is certified that error appears in the above-identified patent and that said Letters Patent is hereby corrected as shown below:

On title page

Item (72) "Inventors", Third Reference "Johnathan" should read --Jonathan--.

Signed and Sealed this
Seventh Day of October, 2014

Michelle K. Lee
*Deputy Director of the United States Patent and Trademark Office*